US012504032B2

(12) United States Patent
Serle et al.

(10) Patent No.: US 12,504,032 B2
(45) Date of Patent: Dec. 23, 2025

(54) FASTENER ASSEMBLY HAVING FLUSH FACED WORKING PORTION

(71) Applicant: Screw This Screw That LLC, Daytona Beach, FL (US)

(72) Inventors: Brandon A. Serle, Daytona Beach, FL (US); Jeffrey Q. Serle, Flagler Beach, FL (US)

(73) Assignee: Screw This Screw That LLC, Daytona Beach, FL (US)

( * ) Notice: Subject to any disclaimer, the term of this patent is extended or adjusted under 35 U.S.C. 154(b) by 117 days.

(21) Appl. No.: 18/136,094

(22) Filed: Apr. 18, 2023

(65) Prior Publication Data
US 2024/0352960 A1 Oct. 24, 2024

(51) Int. Cl.
*F16B 23/00* (2006.01)
(52) U.S. Cl.
CPC ................. *F16B 23/0038* (2013.01)
(58) Field of Classification Search
CPC .. F16B 23/0038; F16B 23/00; F16B 23/0007; F16B 23/0061; F16B 23/0069; F16B 23/0076; F16B 31/02; F16B 41/005; Y10S 411/91
USPC ............ 411/403, 372.5, 372.6, 402
See application file for complete search history.

(56) References Cited

U.S. PATENT DOCUMENTS

| | | | |
|---|---|---|---|
| 2,133,409 A | | 10/1938 | Webb |
| 2,555,197 A | * | 5/1951 | Lasky ............... F16B 23/00 74/548 |
| 3,073,206 A | * | 1/1963 | Rudolph ............ F16B 23/0069 81/461 |
| 3,405,595 A | * | 10/1968 | Peterson ............ F16B 23/00 411/405 |
| 3,468,211 A | * | 9/1969 | Suan ............... F16B 39/06 411/397 |
| 3,698,267 A | | 10/1972 | Denney |

(Continued)

FOREIGN PATENT DOCUMENTS

| | | |
|---|---|---|
| CN | 208858734 U | 5/2019 |
| CN | 211145052 U | 7/2020 |

(Continued)

OTHER PUBLICATIONS

ISA/US, International Search Report and Written Opinion for corresponding PCT Patent application No. PCT/US24/14960, mailed Jun. 24, 2024, 8 pages.

(Continued)

*Primary Examiner* — Christine M Mills
*Assistant Examiner* — Dil K. Magar
(74) *Attorney, Agent, or Firm* — NK Patent Law

(57) ABSTRACT

A fastener assembly includes a shank having a threaded portion for guiding the fastener assembly into a correspondingly threaded portion of another fastener or a working surface and a head engaged with the shank for receiving a tool. The head defines a cutout for receiving an insert. The insert includes a housing for being fit into the cutout to secure the insert to the head and a compressible fastener plunger defining a recess for receiving a working end of a tool. The compressible fastener plunger is configured for translation within the housing along a longitudinal axis. The housing interferencingly engages the compressible fastener plunger to limit upward movement along the longitudinal axis.

20 Claims, 10 Drawing Sheets

(56) References Cited

U.S. PATENT DOCUMENTS

| | | | | |
|---|---|---|---|---|
| 3,747,168 A * | 7/1973 | Snarskis | ................ | F16B 5/025 |
| | | | | 411/398 |
| 4,822,227 A * | 4/1989 | Duran | ................... | F16B 5/0208 |
| | | | | 411/403 |
| 5,074,730 A * | 12/1991 | Duran | ................... | F16B 5/0208 |
| | | | | 411/374 |
| 5,449,260 A | 9/1995 | Whittle | | |
| 5,603,472 A * | 2/1997 | Hutter, III | ............... | F16B 35/06 |
| | | | | 411/910 |
| 6,048,151 A * | 4/2000 | Kwee | ..................... | F16B 39/06 |
| | | | | 411/948 |
| 6,315,485 B1 | 11/2001 | Speck | | |
| 6,634,842 B2 * | 10/2003 | Ueno | ................... | F16B 41/005 |
| | | | | 411/375 |
| 9,759,510 B1 | 9/2017 | Kempf | | |
| 2006/0199151 A1 | 9/2006 | Hurson | | |
| 2006/0238280 A1 * | 10/2006 | Libohova | ................ | F16F 6/005 |
| 2010/0322741 A1 * | 12/2010 | Lanneree | ............. | F16B 41/005 |
| | | | | 411/500 |
| 2012/0055212 A1 * | 3/2012 | Nicoara | ................ | E05B 35/003 |
| | | | | 70/276 |
| 2013/0047797 A1 * | 2/2013 | Lukes | .................. | B25B 15/005 |
| | | | | 81/460 |
| 2019/0078606 A1 | 3/2019 | Shehab | | |
| 2019/0154074 A1 * | 5/2019 | Berrell | ................. | F16B 41/005 |
| 2020/0332821 A1 | 10/2020 | Chasse | | |
| 2022/0218447 A1 | 7/2022 | Lozada | | |
| 2022/0333632 A1 | 10/2022 | Klein | | |
| 2023/0204065 A1 | 6/2023 | Hatch | | |

FOREIGN PATENT DOCUMENTS

| | | | | |
|---|---|---|---|---|
| CN | 212899292 U | | 4/2021 | |
| DE | 3841137 A1 | | 6/1990 | |
| DE | 102008013895 A1 * | | 11/2008 | .......... F16B 23/0007 |
| EP | 1157217 B1 | | 9/2005 | |
| EP | 1861033 B1 | | 6/2012 | |
| JP | 3362131 B1 * | | 1/2003 | ............ F16B 41/005 |

OTHER PUBLICATIONS

ISA/US, International Search Report and Written Opinion for corresponding PCT Patent application No. PCT/US23/79570, mailed Apr. 3, 2024, 8 pages.

* cited by examiner

SECTION A-A

FASTENER ASSEMBLY HAVING FLUSH FACED WORKING PORTION

TECHNICAL FIELD

The present invention relates generally to a fastener assembly having a flush faced or smooth head fastener that has a hidden allen or other key hole that appears when it is depressed into the face

BACKGROUND

Fasteners typically have a shank and a working head attached to the shank. The shank is threaded and rotational movement of the shank via a tool rotating the working head causes longitudinal movement of the fastener within a correspondingly threaded second fastener or working surface.

The working head though is almost always either exposed for above-surface fasteners such as a bolt with a hex head, or below surface for a countersuck fastener that receives a tool within a recess of the head. However, this countersunk fastener leaves the recess exposed.

There is a need for flush face/smooth head fasteners in various industries. For example, in the pharmaceutical field, there is a need for a fastener with no indents on the head, for example, for a so-called Phillips head, slot head, and internal hex head that facilitates and aids in good cleaning practices. Bacteria and organic matter can grow in places that are not regularly cleaned or wiped down. A flush fastener eliminates the need to use special tools to clean crevices created from indents in fasteners. These crevices are typically too small for mechanical cleaning which will allow for contamination to build up. The flush face and smooth head fasteners allows the screws to be used in environments that must remain sterile or be made aseptic. These uses could be, for example, in laboratories, clean rooms, and surgical suites.

Additionally, in the Aerospace field, there is a need for a fastener that minimizes drag in aircraft. Indents in the current fasteners on the market today induce extra drag on surfaces. A flush fastener will eliminate the extra drag cause from the crevices in the heads of standard fasteners.

These and other disadvantages are addressed by the disclosure provided herein.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Embodiments according to the invention can provide a fastener assembly having a flush faced or smooth head fastener that has a hidden allen or other key hole that appears when it is depressed into the face.

According to one or more embodiments, a fastener assembly includes a shank having a threaded portion for guiding the fastener assembly into a correspondingly threaded portion of another fastener or a working surface and a head engaged with the shank for receiving a tool. The head defines a cutout for receiving an insert. The insert includes a housing for being fit into the cutout to secure the insert to the head and a compressible fastener plunger defining a recess for receiving a working end of a tool. The compressible fastener plunger is configured for translation within the housing along a longitudinal axis. The housing interferencingly engages the compressible fastener plunger to limit upward movement along the longitudinal axis.

According to one or more embodiments, the housing defines an inwardly extending shoulder that engages an outwardly extending shoulder on the compressible fastener plunger to provide the interferencingly engagement to limit upward movement along the longitudinal axis.

According to one or more embodiments, the fastener assembly further includes a biasing member between the compressible fastener plunger and a surface of the cutout for biasing the compressible fastener plunger in an upward direction relative to the longitudinal axis.

According to one or more embodiments, the biasing member is a spring, and the compressible fastener plunger defines a recessed seat for receiving an upward end of the spring.

According to one or more embodiments, the shank defines a recessed seat for receiving a downward end of the spring.

According to one or more embodiments, the biasing member is a magnet.

According to one or more embodiments, a top surface of the compressible fastener plunger is aligned with a top surface of the head when the compressible fastener plunger has been biased in upwardly.

According to one or more embodiments, the housing is press fit into the cutout.

According to one or more embodiments, the recess of the compressible fastener plunger is a hex shaped recess.

According to one or more embodiments, the fastener includes a pin that is received within an opening defined in the housing and the head of the shank for prohibiting rotation of the housing relative to the shank.

BRIEF DESCRIPTION OF THE DRAWINGS

The foregoing, as well as the following Detailed Description, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DESCRIPTION OF EMBODIMENTS ACCORDING TO THE INVENTION

The following description and figures are illustrative and are not to be construed as limiting. Numerous specific details are described to provide a thorough understanding of the disclosure. In certain instances, however, well-known or conventional details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Figure 1:
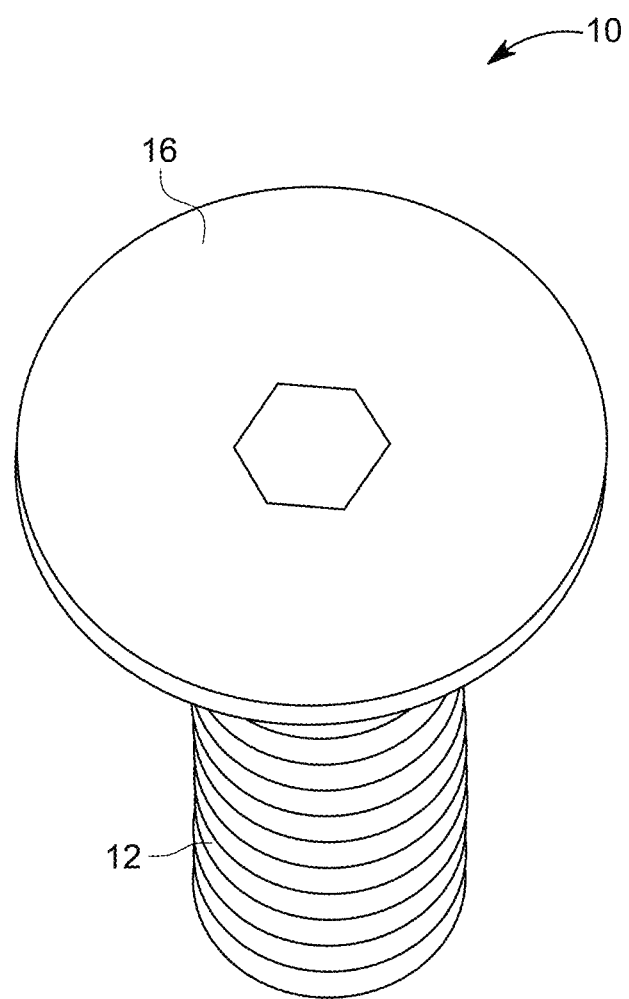
FIG. 1 illustrates a perspective view of a fastener assembly where the fastener assembly is illustrated with a flushed face working surface.
Figure 2:
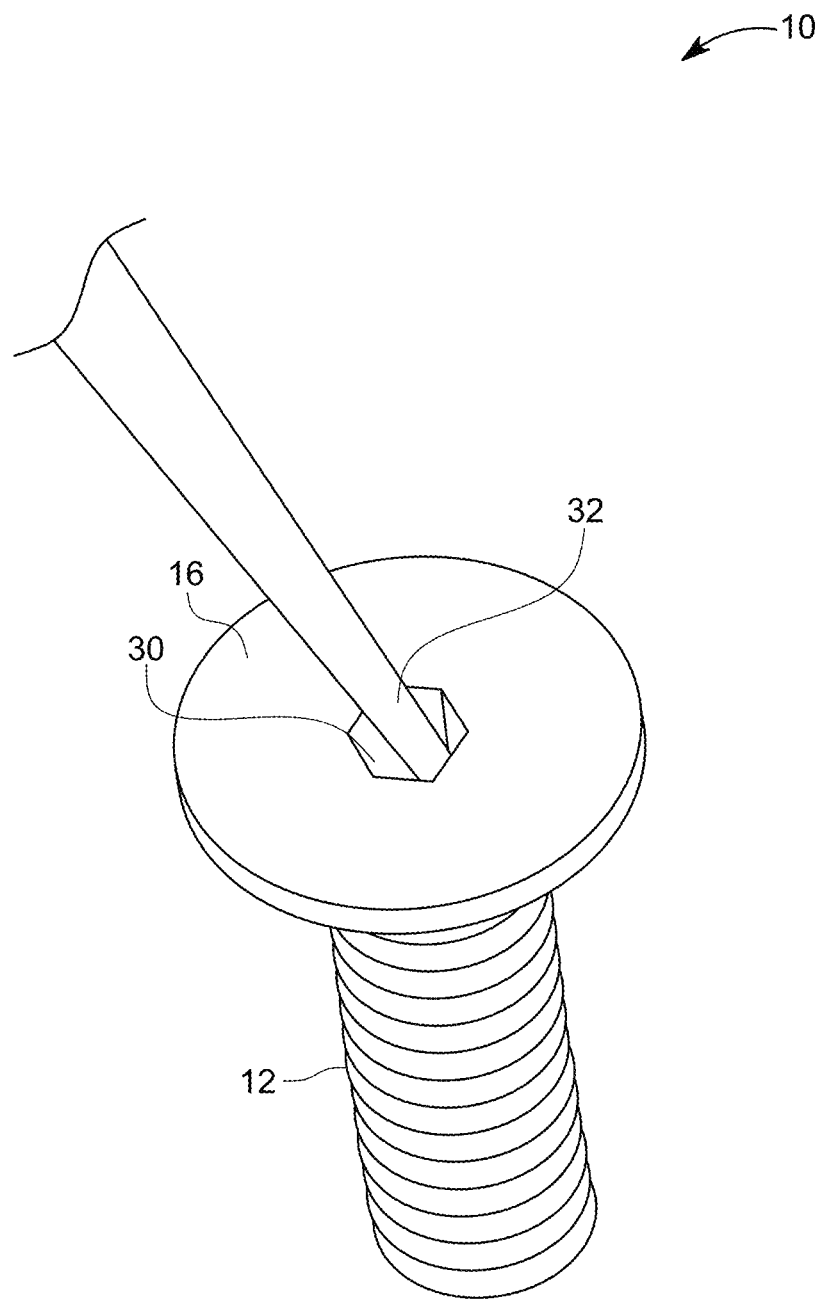
FIG. 2 illustrates a perspective view of the fastener assembly of FIG. 1 where the fastener assembly is illustrated with a recessed working surface.

FIG. 1 illustrates a perspective view of a fastener assembly where the fastener assembly is illustrated with a flushed face working surface. The fastener assembly is generally designated as 10 throughout the drawings. FIG. 2 illustrates a same general perspective view as shown in FIG. 1, however, here the fastener assembly 10 is shown with a recessed working surface, where the fastener assembly 10 has a recessed working surface in response to a tool or other device pressing downwardly on an insert within the head that will be described further herein. This arrangement allows for a flush faced, otherwise recessed head fastener that addresses the disadvantages associated with conventional fasteners that are described herein.

Figure 3A:
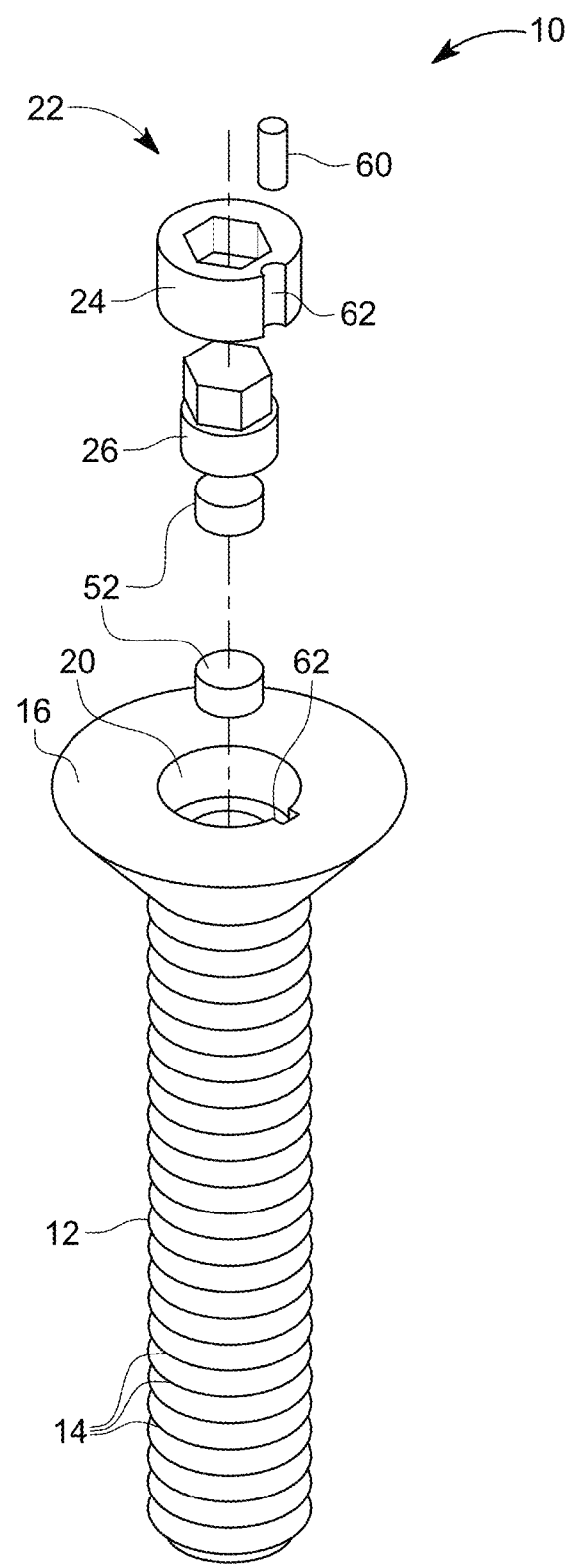
FIG. 3A illustrates a perspective view of an embodiment of the fastener assembly where a magnet provides biasing forces to bias the working surface of the fastener to the flushed face arrangement of FIG. 1.
Figure 3B:
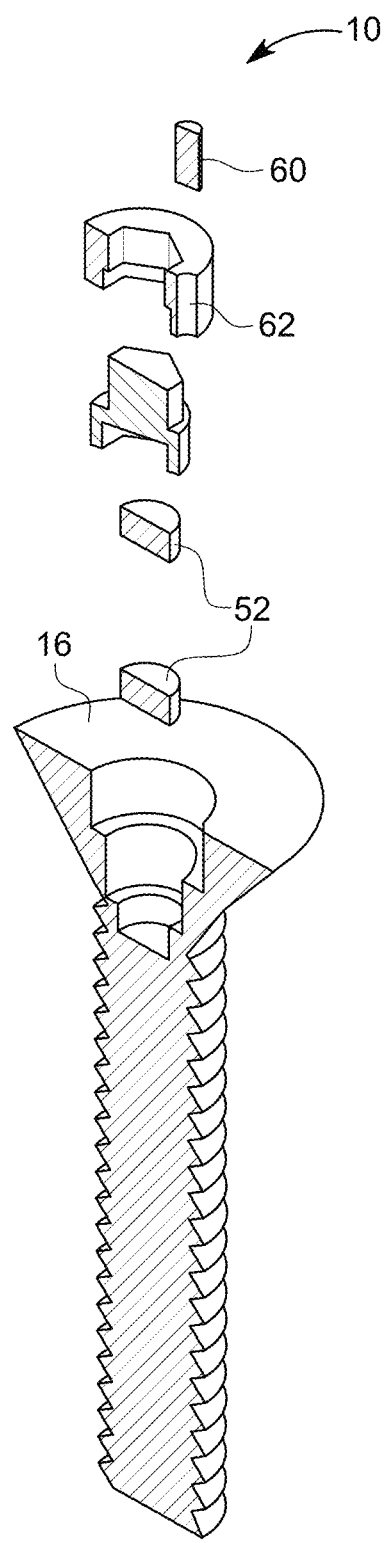
FIG. 3B is a cut-out view of the embodiment illustrated in FIG. 3A.
Figure 3C:
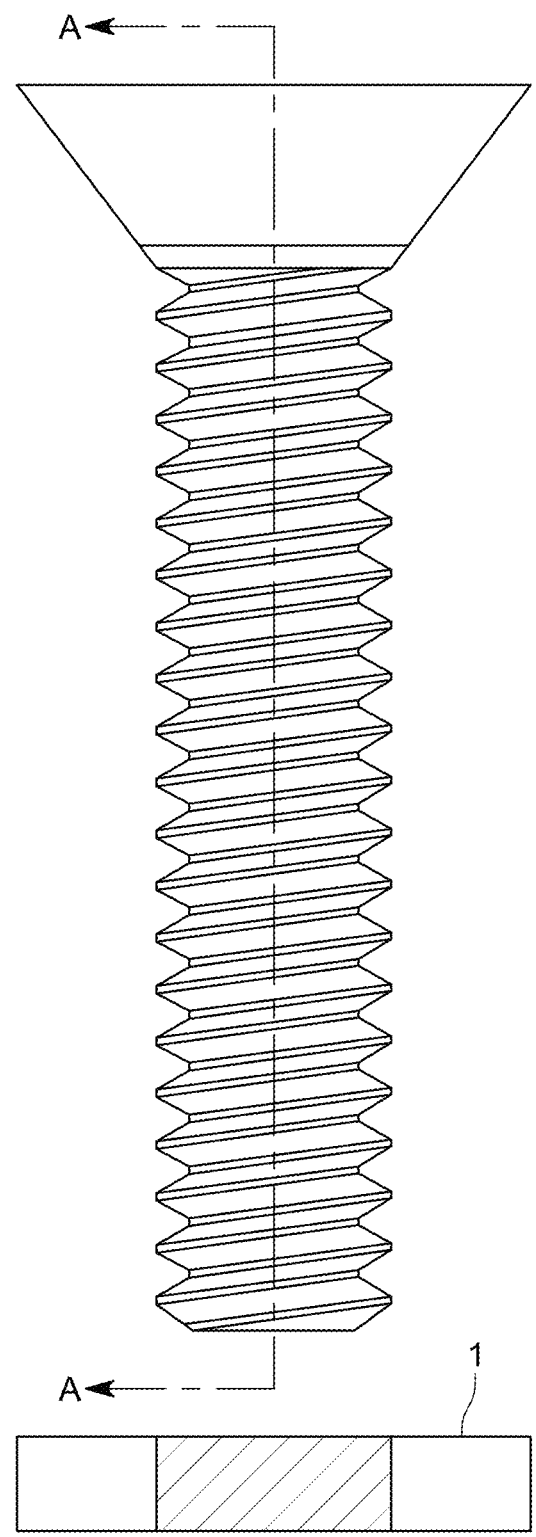
FIG. 3C is a front facing view of the embodiment of the fastener assembly of FIG. 3A, where the fastener assembly is shown against a working surface that receives the fastener assembly.
Figure 3D:
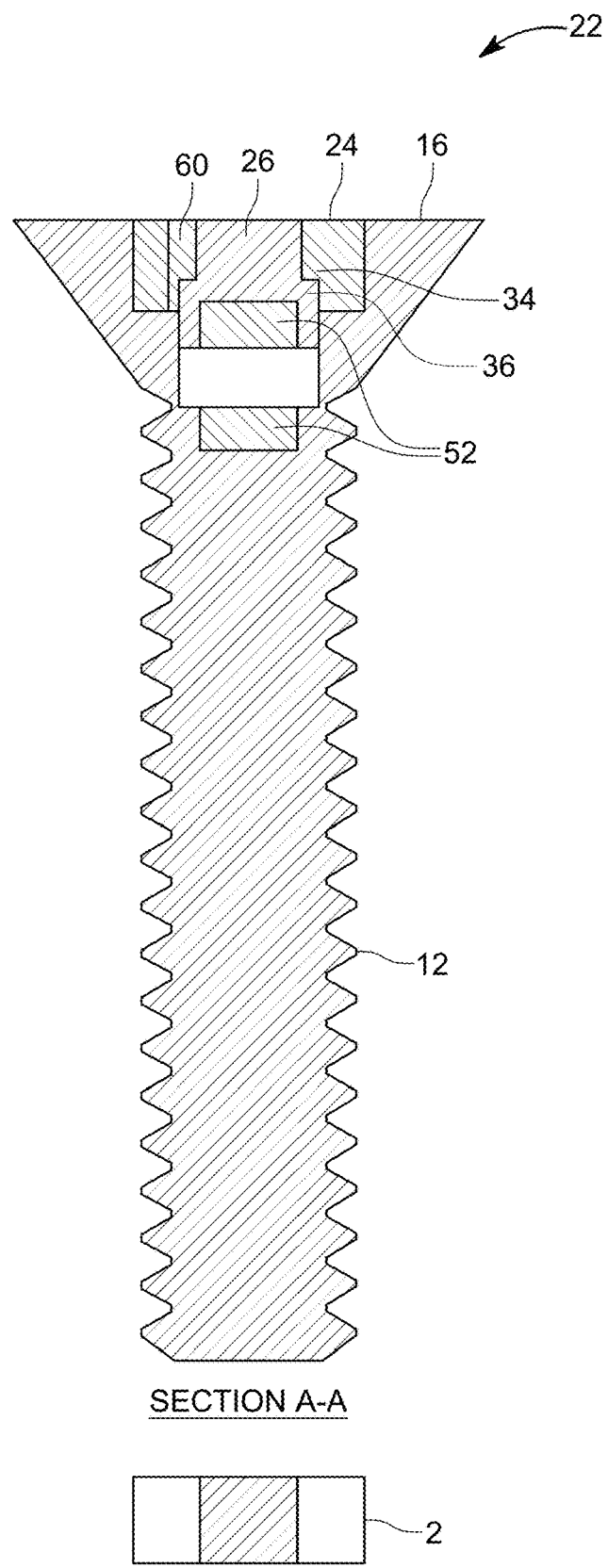
FIG. 3D is a front facing, cutout view of the view of FIG. 3C where the fastener assembly is shown against another fastener that receives the fastener assembly.
Figure 4A:
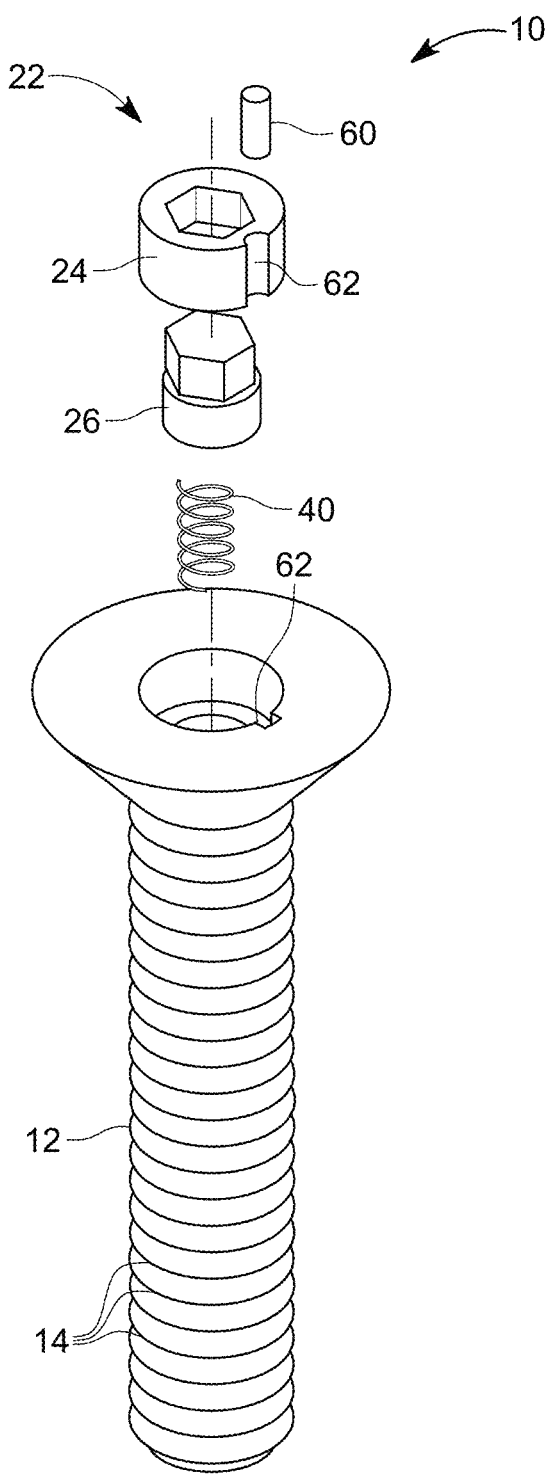
FIG. 4A illustrates a perspective view of an embodiment of the fastener assembly where a spring provides biasing forces to bias the working surface of the fastener to the flushed face arrangement of FIG. 1.
Figure 4B:
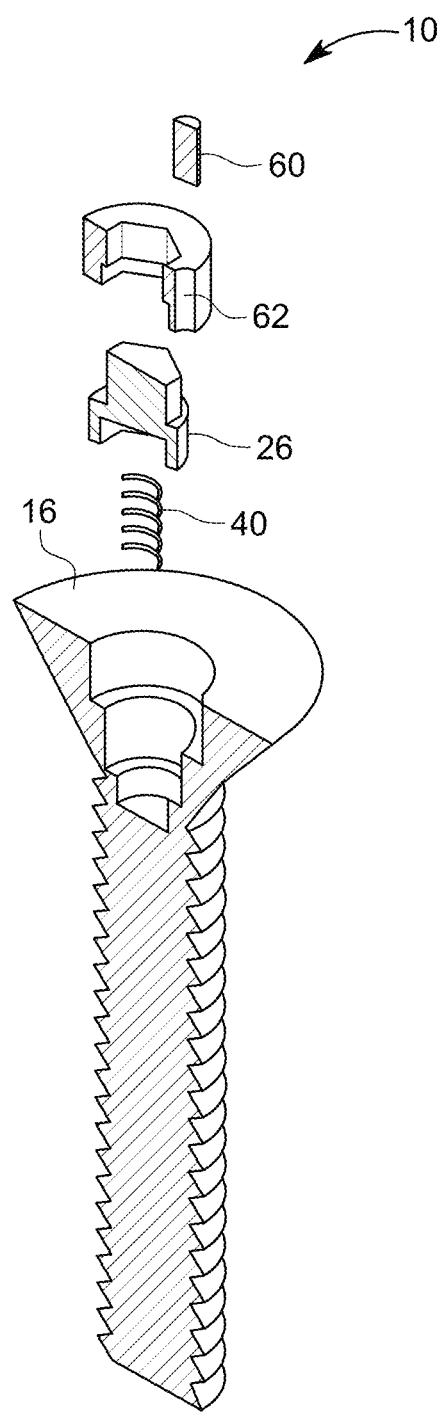
FIG. 4B is a cut-out view of the embodiment illustrated in FIG. 4A.
Figure 4C:
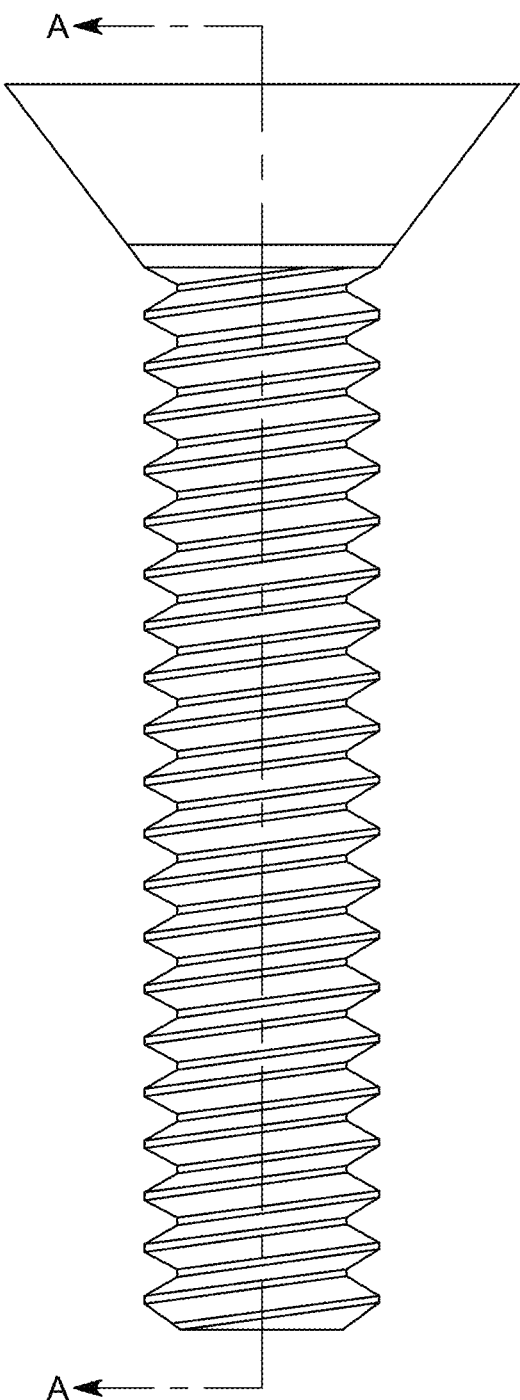
FIG. 4C is a front facing view of the embodiment of the fastener assembly of FIG. 4A.
Figure 4D:
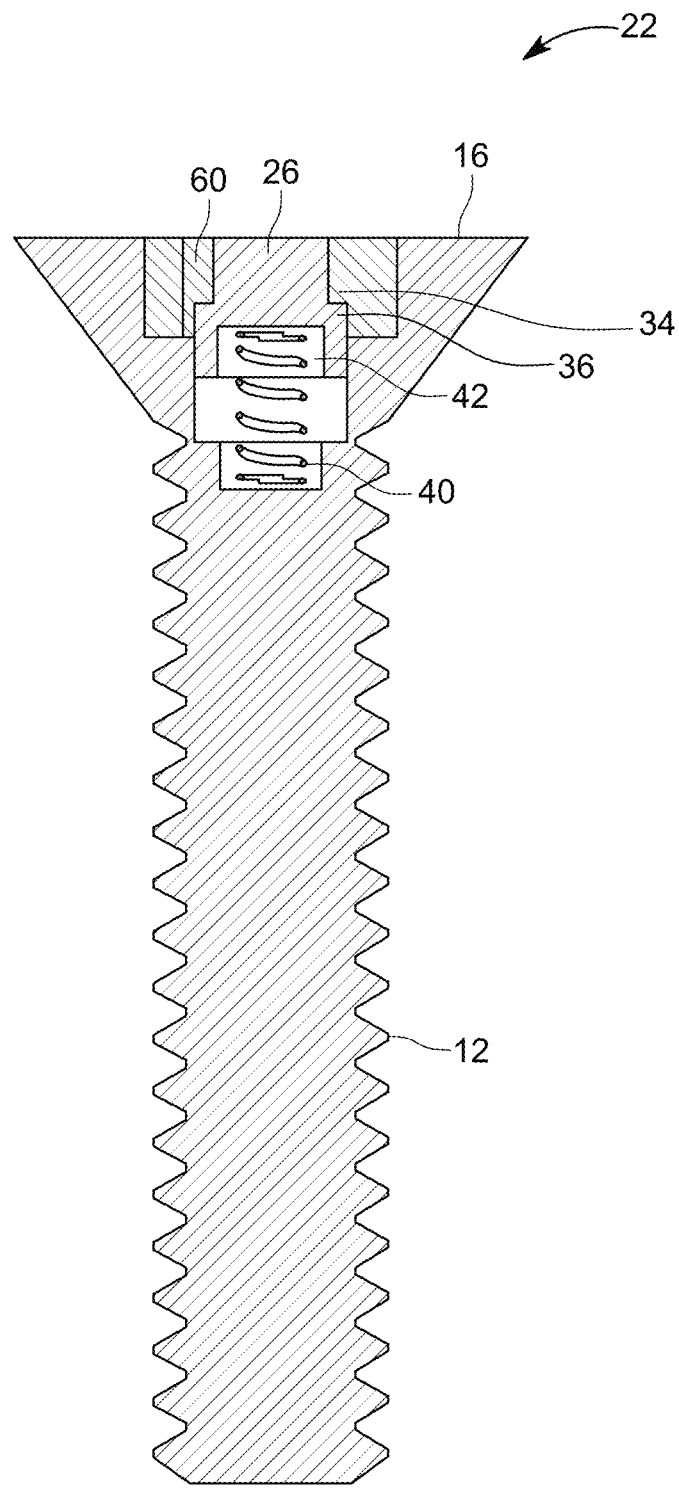
FIG. 4D is a front facing, cutout view of the view of FIG. 4C.

The fastener assembly 10 includes a shank 12 having a threaded portion 14 for guiding the fastener assembly 10 into a correspondingly threaded portion 2 of another fastener (as illustrated in FIG. 3D) or a working surface (as illustrated in FIG. 3C). The threaded portion 14 is a conventional threaded portion and may be right or left hand threaded, or any other appropriately configured threaded assembly. The fastener assembly 10 includes a head 16 engaged with the shank 12 for receiving a tool. A tool 32 is generally represented in FIG. 2, however, any appropriately configured tool may be used.

The head 16 defines a cutout 20 for receiving an insert 22. The insert 22 includes a housing 24 for being fit into the cutout 20 to secure the insert 22 to the head 16. In one or more embodiments, the insert 22 is press fit into the cutout 20, whereas, in other embodiments, the insert 22 can be welded, glued, or otherwise secured to the head 16.

As illustrated, a compressible fastener plunger 26 is positioned within the head 16. The plunger defines a recess 30 for receiving the working end of a tool 32. As illustrated, the recess 30 can be a hex head recess, i.e. a so-called allen head, though other shapes such as a square security, torx head, or other may be employed. The compressible fastener plunger 26 is configured for translation within the housing 24 along a longitudinal axis. This translation provides for the ability for the head to be a flush mount as shown in FIG. 1, and then depressed to allow for receipt of a working tool as shown in FIG. 2.

The housing 24 interferencingly engages the compressible fastener plunger 26 to limit upward movement along the longitudinal axis. The upward movement is in response to forces applied from a biasing member, which will be described further herein. The upward movement thus makes the fastener assembly 10 have a flush faced arrangement as shown in FIG. 1 as an initial, or at rest arrangement. The biasing force provided is thus less than the downward force provided by the working tool so that the compressible fastener plunger 26 can be depressed.

According to one or more embodiments, the housing 24 defines an inwardly extending shoulder 34 that engages an outwardly extending shoulder 36 on the compressible fastener plunger to provide the interferencingly engagement to limit upward movement along the longitudinal axis. This is well illustrated in FIG. 3D.

According to one or more embodiments, the biasing member is a spring between the compressible fastener plunger and a surface of the cutout for biasing the compressible fastener plunger in an upward direction relative to the longitudinal axis.

According to one or more embodiments, the biasing member is a spring 40, and the compressible fastener plunger 26 defines a recessed seat 42 for receiving an upward end 44 of the spring 40. This is well illustrated throughout the various versions of FIG. 4. The shank 12 may further define a recessed seat 42 for receiving a downward end 50 of the spring 40. The spring 40 thus provides biasing forces to bias the compressible fastener plunger 26 in the upward direction to provide for the flush faced arrangement as shown in FIG. 1.

According to one or more embodiments, the biasing member is a magnet 52. This is well-illustrated in FIG. 3A. The magnet may be any appropriately configured magnet and may be recessed within a seat or similar arrangement within the cutout 20 of the head 16 and/or shank 12. A pin 60 may be received within open 62, where opening 62 is defined in the head 16 and insert 22. The pin 60 may be removable, or it may be press fit therein, and is configured to prohibit rotating of the housing 24 relative to the shank 12.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure.

As will be described in greater detail below with reference to the figures, the subject matter described herein provides Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item. Although any methods, devices, and materials similar or equivalent to those described herein can be used in the practice or testing of the presently disclosed subject matter, representative methods, devices, and materials are now described.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A fastener assembly comprising:
    a shank having a threaded portion for guiding the fastener assembly into a correspondingly threaded portion of another fastener or a working surface;
    a head engaged with the shank for receiving a tool,
    wherein the head defines a cutout for receiving an insert, the cutout extending at least partially into the shank, wherein the insert comprises:
    a housing for being fit into the cutout to secure the insert to the head;
the housing having a void through a center of the housing;
    a compressible fastener plunger configured for insertion through the void of the housing and having a shape that corresponds with the working end of the tool,
    wherein the compressible fastener plunger is configured for translation within the housing along a longitudinal axis,
    wherein downward translational movement of the compressible fastener plunger biases the compressible fastener plunger in an orientation that is inferior with respect to the housing;
    wherein the housing interferencingly engages the compressible fastener plunger to limit upward movement along the longitudinal axis; and
    wherein the housing and the compressible fastener plunger each have a surface plane that is coplanar with one another and the head of the fastener when the insert is biased upward in a resting position.

2. The fastener assembly of claim 1, wherein the housing defines an inwardly extending shoulder that engages an outwardly extending shoulder on the compressible fastener plunger to provide the interferencingly engagement to limit upward movement along the longitudinal axis.

3. The fastener assembly of claim 1, further including a biasing member between the compressible fastener plunger and a surface of the cutout for biasing the compressible fastener plunger in an upward direction relative to the longitudinal axis.

4. The fastener assembly of claim 3, wherein the biasing member is a spring, and the compressible fastener plunger defines a recessed seat for receiving an upward end of the spring.

5. The fastener assembly of claim 3, wherein the shank defines a recessed seat for receiving a downward end of the biasing member.

6. The fastener assembly of claim 3, wherein the biasing member is a magnet oriented to provide a biasing force to the compressible fastener plunger.

7. The fastener assembly of claim 3, wherein a top surface of the compressible fastener plunger is aligned with a top surface of the head when the compressible fastener plunger has been biased in upwardly.

8. The fastener assembly of claim 1, wherein the housing is press fit into the cutout.

9. The fastener assembly of claim 1, wherein the recess of the compressible fastener plunger is a hex shaped recess.

10. The fastener assembly of claim 1, further including a pin that is received within an opening defined in the housing and the head of the shank for prohibiting rotation of the housing relative to the shank.

11. A fastener assembly comprising:
    a shank having a threaded portion for guiding the fastener assembly into a correspondingly threaded portion of another fastener or a working surface;
    a head engaged with the shank for receiving a tool,
    wherein the head defines a cutout for receiving an insert, wherein the insert comprises:
    a housing for being fit into the cutout to secure the insert to the head, the housing having a surface plane that is coplanar with the head of the fastener when the housing is inserted into the head;
    a compressible fastener plunger having a first portion and a second portion, the first portion having a first dimension and the second portion having a second dimension,
    wherein the first portion has a shape corresponding with a working end of a tool,
    wherein the second dimension is greater than the first dimension such that the second portion prevents the compressible fastener plunger from biasing upward beyond the surface plane of the housing,
    wherein the compressible fastener plunger is configured for translation within the housing along a longitudinal axis,
    wherein the housing interferencingly engages the compressible fastener plunger to limit upward movement along the longitudinal axis,
    an interlocking means between the housing and the head of the shank to prohibit rotation of the housing relative to the shank.

12. The fastener assembly of claim 11, wherein the housing defines an inwardly extending shoulder that engages an outwardly extending shoulder on the compressible fastener plunger to provide the interferencingly engagement to limit upward movement along the longitudinal axis.

13. The fastener assembly of claim 11, further including a biasing member between the compressible fastener plunger and a surface of the cutout for biasing the compressible fastener plunger in an upward direction relative to the longitudinal axis.

14. The fastener assembly of claim 13, wherein the biasing member is a spring, and the compressible fastener plunger defines a recessed seat for receiving an upward end of the spring.

15. The fastener assembly of claim 14, wherein the shank defines a recessed seat for receiving a downward end of the spring.

16. The fastener assembly of claim 13, wherein the biasing member is a magnet oriented for magnetic repelling forces to provide a biasing force against the compressible fastener plunger.

17. The fastener assembly of claim 13, wherein a top surface of the compressible fastener plunger is aligned with a top surface of the head when the compressible fastener plunger has been biased in upwardly.

18. The fastener assembly of claim 11, wherein the housing is press fit into the cutout.

19. The fastener assembly of claim 11, wherein the recess of the compressible fastener plunger is a hex shaped recess.

20. A fastener assembly comprising:
    a shank having a threaded portion for guiding the fastener assembly into a correspondingly threaded portion of another fastener or a working surface;

a head engaged with the shank for receiving a tool, wherein the head defines a cutout for receiving an insert, wherein the insert comprises:

a housing for being fit into the cutout to secure the insert to the head;

a compressible fastener plunger configured for insertion through the cutout of the housing, wherein the compressible fastener plunger is configured for translation within the housing along a longitudinal axis, wherein the housing interferencingly engages the compressible fastener plunger to limit upward movement along the longitudinal axis;

two magnets oriented with opposing poles facing each and seated between the compressible fastener plunger and a surface of the cutout for biasing the compressible fastener plunger in an upward direction relative to the longitudinal axis; and wherein a surface plane of the housing, the compressible fastener plunger, and the head of the fastener are coplanar with one another when the insert is biased upward in a resting position.

\* \* \* \* \*